US006824591B2

(12) United States Patent
Holle et al.

(10) Patent No.: US 6,824,591 B2
(45) Date of Patent: Nov. 30, 2004

(54) AIR FILTER FOR AN INTERNAL COMBUSTION ENGINE

(75) Inventors: Roger Holle, Maulbronn (DE); Michael Wessels, Weissach (DE); Bernd Mueller, Moensheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/361,009

(22) Filed: Feb. 10, 2003

(65) Prior Publication Data

US 2003/0172812 A1 Sep. 18, 2003

(30) Foreign Application Priority Data

Feb. 9, 2002 (DE) ........................................ 102 05 416
Mar. 27, 2002 (DE) ........................................ 102 13 604

(51) Int. Cl.[7] ................................................ B01D 46/00
(52) U.S. Cl. .......................... 95/273; 55/385.3; 96/384; 96/387; 181/141; 181/209; 181/296
(58) Field of Search ................................ 55/385.3, 418; 95/273; 96/380–388, FOR 172; 181/141, 209, 211, 284, 296

(56) References Cited

U.S. PATENT DOCUMENTS

| | | | | | |
|---|---|---|---|---|---|
| 1,173,403 | A | * | 2/1916 | Anderson | 165/41 |
| 1,200,688 | A | * | 10/1916 | Anderson | 165/51 |
| 2,636,125 | A | * | 4/1953 | Southworth | 343/755 |
| 2,755,882 | A | * | 7/1956 | MacCaferri | 181/284 |
| 2,788,086 | A | * | 4/1957 | Sebok | 96/380 |
| 2,848,065 | A | * | 8/1958 | Sebok | 96/381 |
| 2,904,129 | A | * | 9/1959 | McMichael | 96/383 |
| 3,209,520 | A | * | 10/1965 | McKinlay | 96/386 |
| 4,124,091 | A | * | 11/1978 | Mizusawa | 181/231 |
| 4,192,660 | A | * | 3/1980 | Ishidera et al. | 96/387 |
| 4,197,922 | A | * | 4/1980 | Weber et al. | 181/229 |
| 4,713,097 | A | * | 12/1987 | Grawi et al. | 96/380 |
| 5,161,513 | A | * | 11/1992 | Feldinger | 123/590 |
| 5,241,512 | A | * | 8/1993 | Argy et al. | 367/1 |
| 6,382,161 | B1 | * | 5/2002 | Alex et al. | 123/184.53 |
| 2002/0124734 | A1 | * | 9/2002 | Spannbauer et al. | 96/380 |
| 2003/0221562 | A1 | * | 12/2003 | Bloomer | 96/384 |
| 2004/0011011 | A1 | * | 1/2004 | Storz et al. | 55/385.3 |

FOREIGN PATENT DOCUMENTS

| | | |
|---|---|---|
| DE | 1052169 | 3/1959 |
| DE | 19811051 A1 | 9/1999 |
| DE | 19940610 A1 | 3/2001 |
| EP | 0242797 A1 | 10/1987 |

OTHER PUBLICATIONS

English Abstract of Japanese Publication No. 10–339225, published Dec. 22, 1998.

* cited by examiner

*Primary Examiner*—Robert H. Spitzer
(74) *Attorney, Agent, or Firm*—Crowell & Moring LLP

(57) ABSTRACT

An air filter for an internal combustion engine includes an air filter housing, the walls of which encompass a filter compartment in which a filter element is positioned, having an intake and an exhaust. Openings that can be sealed off or opened up based upon the operating conditions of the internal combustion engine are provided in a least one wall of the air filter housing. In this way, effective modulation of induction noise (sound modulation) can be achieved in a simple way and manner.

12 Claims, 4 Drawing Sheets

AIR FILTER FOR AN INTERNAL COMBUSTION ENGINE

This application claims the priority of German applications 102 05 416.9, filed Feb. 9, 2002, and 102 13 604.1, filed Mar. 27, 2002, the disclosures of which are expressly incorporated by reference herein.

BACKGROUND AND SUMMARY OF THE INVENTION

The present invention relates to an air filter for an internal combustion engine including an air filter housing, walls of which encompass a filter chamber, a filter element positioned in the filter chamber, an air filter housing intake, and an air filter housing exhaust. The invention also concerns a process of modulating noise during operation of an internal combustion engine.

One air filter for an internal combustion engine is known from German publication DE 199 40 610 A1, in which it is proposed that one wall of the air filter housing be provided with a diaphragm made of a material that is less resistant to sound waves than the housing wall itself. This is intended to produce a directed generation of sound, allowing the driver to receive adequate information regarding the engine's operating conditions. With this embodiment, however, there is no transmission of airborne noise through the filter housing; consequently, an effective modulation of the induction noise can be achieved only within certain limits.

It is thus one object of the invention to develop a device through which modulation of induction noise can be improved.

This object is attained by providing openings in at least one of the walls of the air filter housing, and by sealing off or opening up the openings depending upon operating conditions of the internal combustion engine.

In operation of the internal combustion engine, airborne noise is transmitted through the air filter housing into the engine compartment through the openings in a wall of the air filter housing. As a result, depending upon the operating conditions of the internal combustion engine, the acoustic pattern within the passenger compartment of the vehicle can be improved as necessary. Under certain operating conditions, however, e.g., in cases of low load and speed, to prevent an intake of warm air that would reduce the output of the internal combustion engine, these openings are designed so that they can be closed. At high loads and speeds, these airborne noise passageways can then be opened, in order to ensure an attractive sound inside the compartment. Furthermore, with the additional openings in the air filter, pulsations in the intake air are reduced, and the air filter housing is less prone to vibration.

With features specified in dependent claims, additional advantageous embodiments of the invention are possible.

In a first embodiment, the closeable openings in the air filter housing are converted in a simple manner using a plate element that is provided with openings and is positioned inside the air filter housing; this plate element operates in conjunction with the openings in one wall of the air filter housing as a sort of sliding register.

The plate element that is provided with the openings can be controlled in a simple manner via an actuator, which is connected to a vacuum tank.

The plate element lies advantageously on the base panel of the air filter housing, as an underbody, and is guided along two rails oriented along the two lengthwise sides of the plate element, which are fastened to the wall of the housing that is equipped with the openings.

In a second embodiment, the openings in one wall of the air filter housing are monitored using flexible flap elements. In this case, the control of the flaps is accomplished via the pressure ratios that prevail within the air filter. At low load and speed, the flaps are closed; at high load and speed and corresponding air flow mass, the vacuum conditions prevailing within the air filter housing increase, and the flexible flaps clear the openings in the air filter housing.

The invention is specified in greater detail in the following description and drawings.

DETAILED DESCRIPTION OF THE INVENTION

Figure 1:
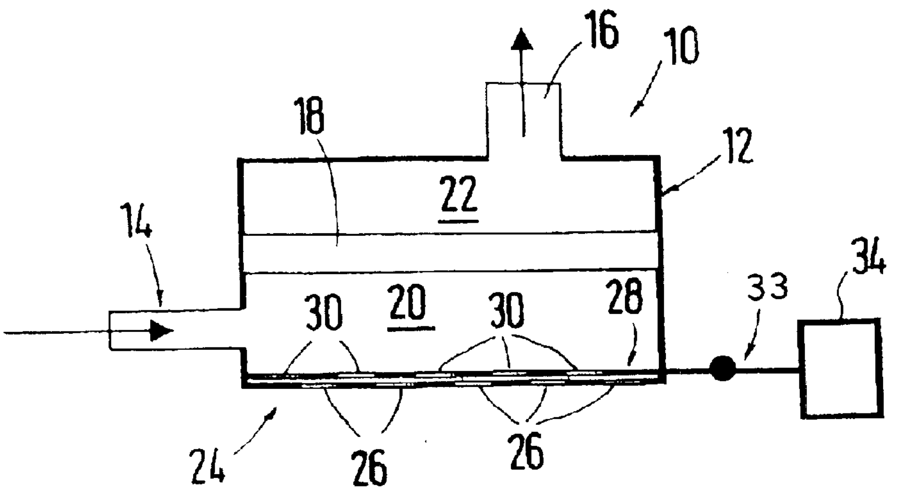
FIG. 1 is a schematic representation of an air filter housing in a first state of operation.
Figure 2:
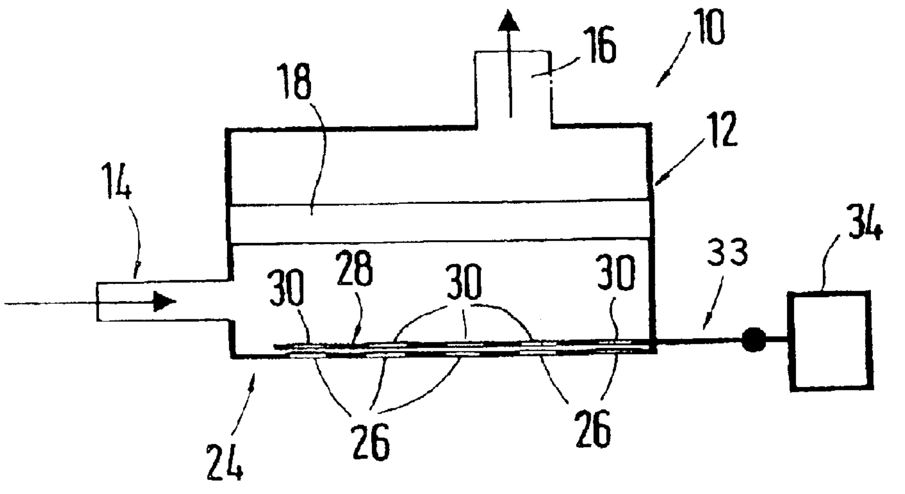
FIG. 2 is a schematic representation of the air filter housing in a second state of operation.

The schematically illustrated air filter 10 includes an air filter housing 12, which is provided with an intake 14 for unfiltered air and an exhaust 16 for filtered air. A filter element 18 is positioned within the air filter housing, dividing the inner space of the air filter housing 12 into a lower chamber, hereinafter referred to as the unfiltered air chamber 20, and an upper chamber, hereinafter referred to as the filtered air chamber 22. The lower housing wall 24 that delimits the unfiltered air chamber 20 is provided with rectangular-shaped openings 26. Along the housing wall 24 is a sliding plate element 28, which is equipped with openings 30, the size and shape of which correspond essentially with the openings in the housing wall 24. To guide the plate element 28, guide rails (not illustrated here) are provided on the two lengthwise sides of the plate element 28, and are mounted on the housing wall 24.

The plate element 28 is connected to an actuator 34 via a coupling rod 33, with this actuator being supplied via a vacuum tank, wherein the coupling rod 33 and/or the plate element 28 are controlled based upon the operating values of the internal combustion engine, e.g., speed, load, or temperature of the intake air.

Figure 3:
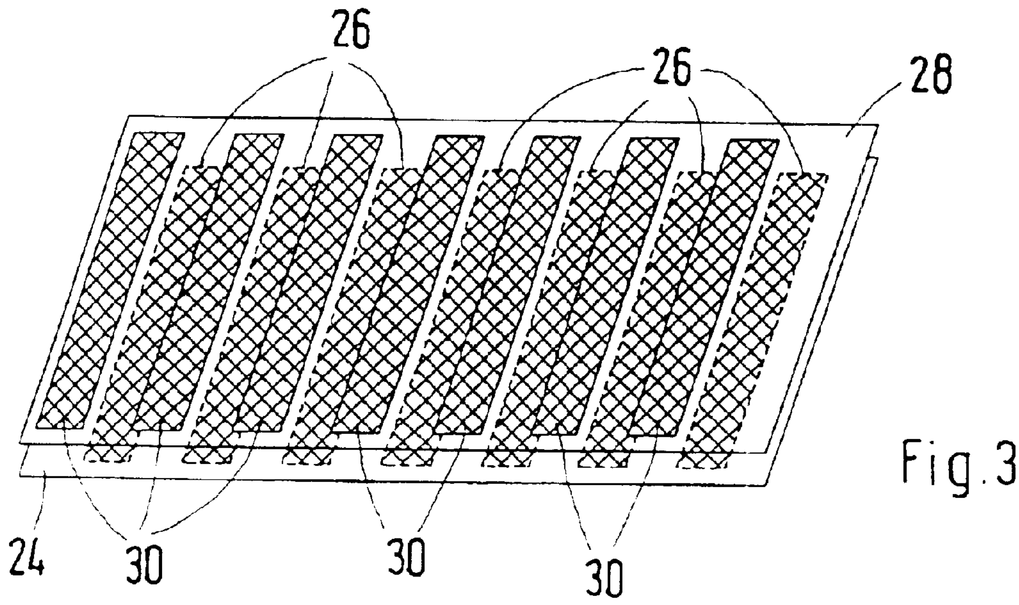
FIG. 3 is a schematic representation of a sliding register in a first operating position.
Figure 4:
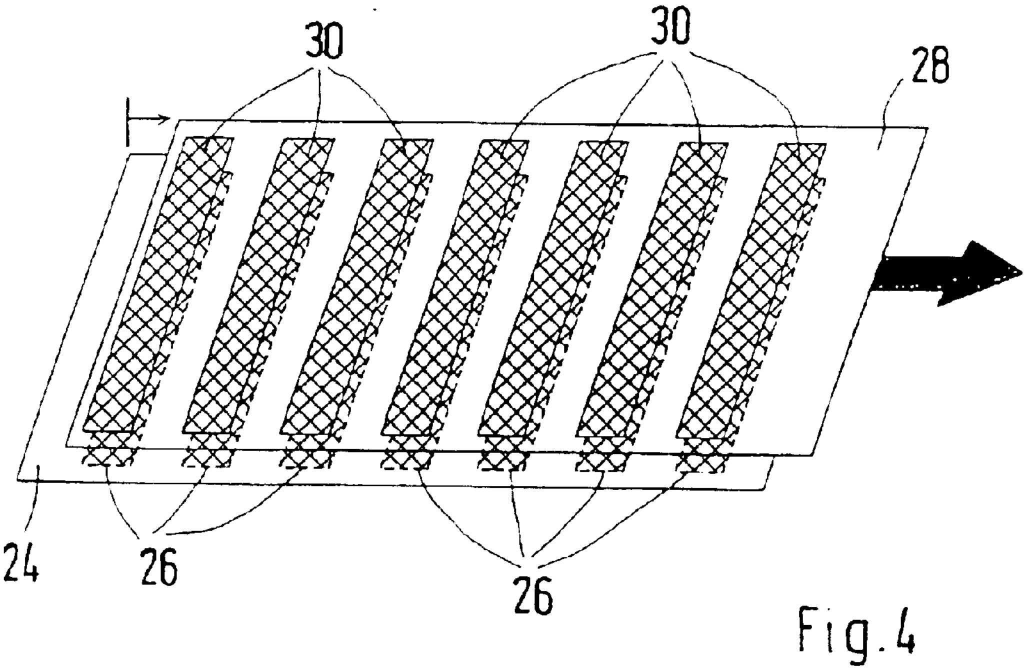
FIG. 4 is a schematic representation of the sliding register in a second operating position.

The control of the sliding register formed by the housing wall 24 and the plate element 28 is implemented such that, as shown in FIG. 3, when the internal combustion engine is operating at idle or at low load and speed, the openings 26 in the housing wall 24 are closed by the plate element 28, while at high load and speed the plate element 28 is shifted via the coupling rod 33 in the direction indicated by the arrow in FIG. 4, so that the openings 26 and 30 are juxtaposed, allowing airborne noise to travel through the air filter housing 12 into the engine compartment. The form and dimensions of the openings 26 and 30 can be adjusted appropriately to comply with different engine applications.

Figure 5:
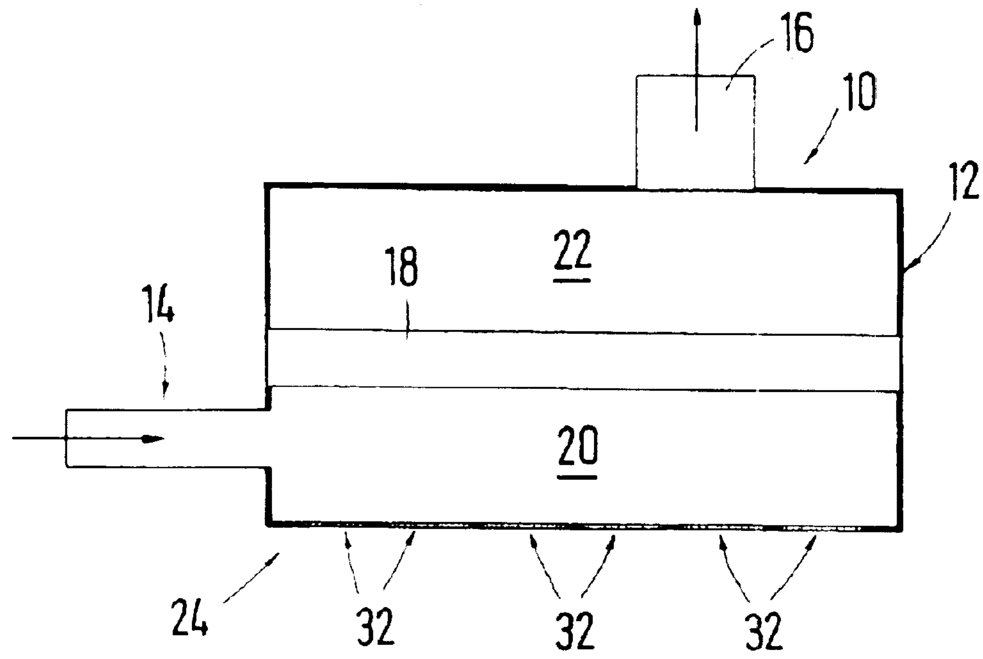
FIG. 5 is a schematic representation of an air filter housing in accordance with a second exemplary embodiment in a first state of operation.
Figure 6:
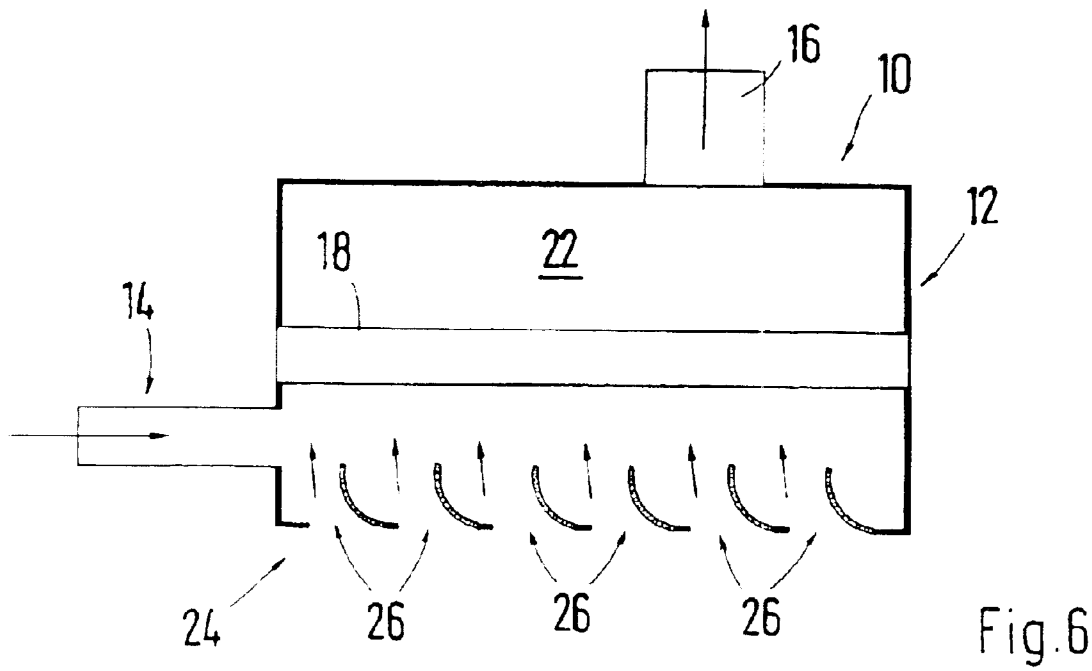
FIG. 6 is a schematic representation of the air filter housing in accordance with the second exemplary embodiment in a second state of operation.
Figure 7:
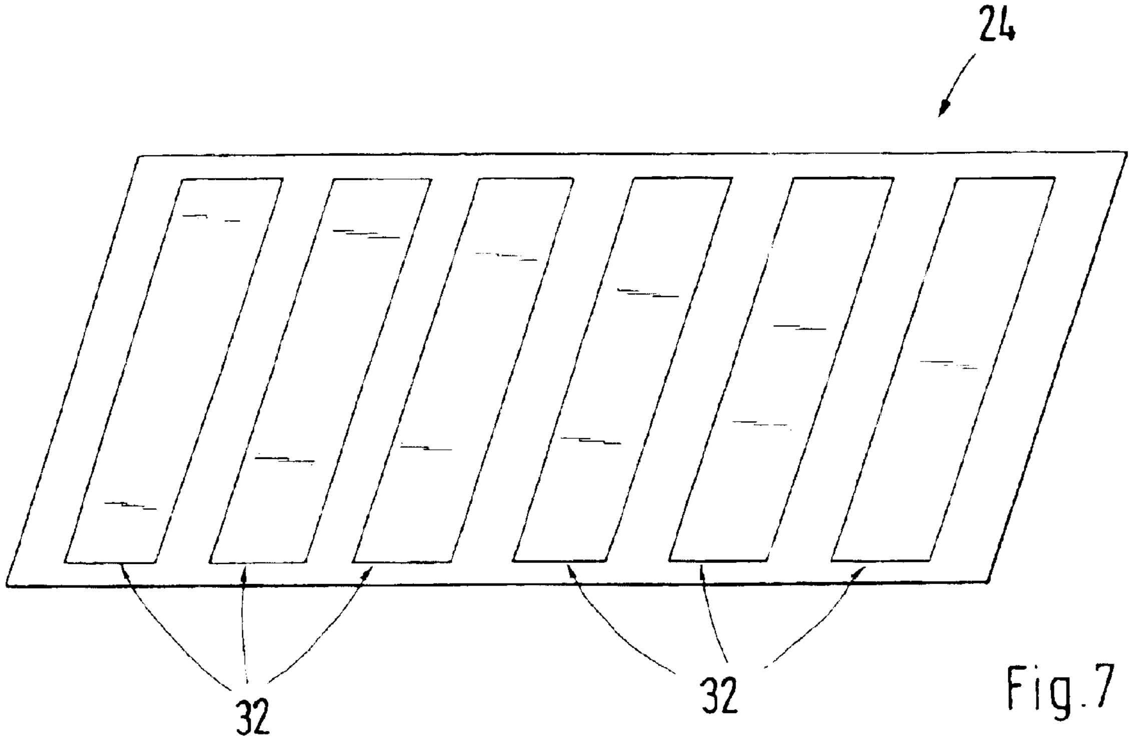
FIG. 7 is a schematic representation of flexible flaps in a first operating position.
Figure 8:
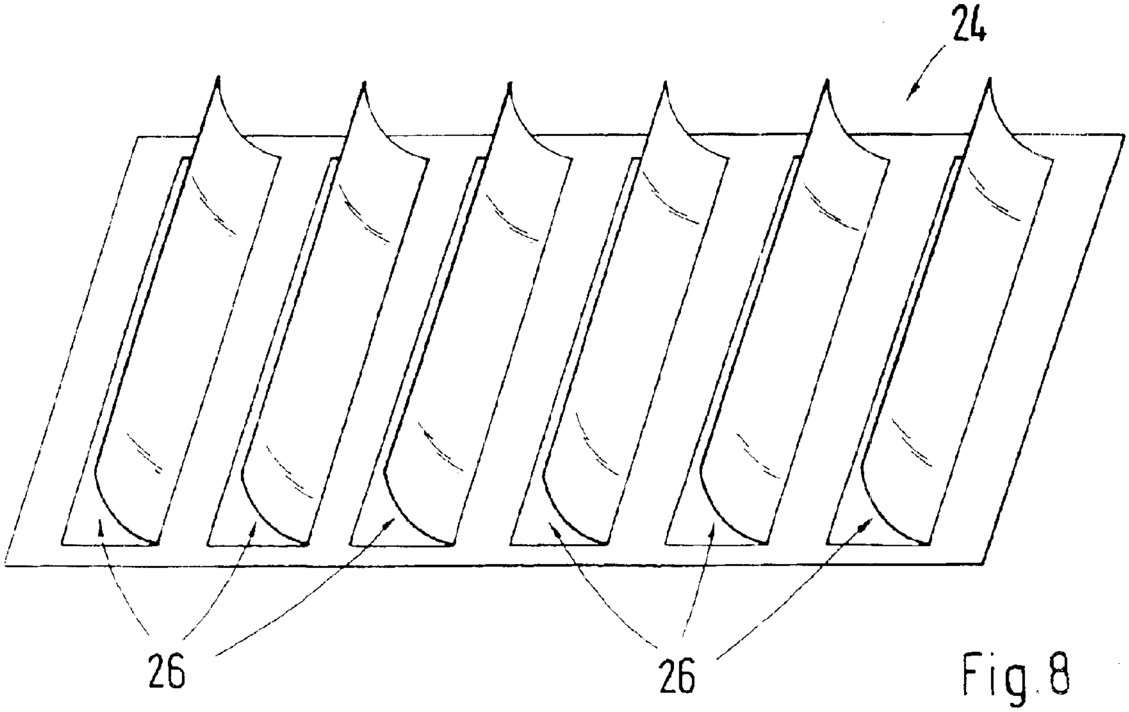
FIG. 8 is a schematic representation of flexible flaps in a second operating position.

In a second exemplary embodiment, in which similar components are indicated using similar reference figures, the openings 26 in the lower housing wall 24 are monitored via flexible flaps 32. The flaps 32, made e.g. of rubber or other similar materials, are mounted on a lengthwise side of the rectangular-shaped openings 26, and correspond in dimension to the dimensions of the openings 26, so that when they are in a closed position (see FIGS. 5, 7) they completely seal off the openings 26. As with the first exemplary embodiment, the flaps 32 seal off the openings 26 when the internal combustion engine is running at idle or at low load and speed, due to the prevailing pressure ratios within the air filter housing 12, while at high load and speed the flaps 32 automatically open toward the inside as a result of the rising vacuum pressure within the air filter housing 12, so that a corresponding transfer of airborne noise is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A process of modulating noise during operation of an internal combustion engine comprising:

providing an air filter including an air filter housing having walls which encompass a filter chamber, a filter element which is positioned in the filter chamber, an intake, and an exhaust, and sealing off or opening up openings provided in at least one wall of the air filter housing depending upon operating conditions of the internal combustion engine by guiding a plate element, equipped with openings, provided in the air filter housing and oriented such that it can be shifted relative to the at least one wall in which the openings are provided, within the air filter housing.

2. The process according to claim 1, wherein the plate element is controlled via an actuator which is connected to a vacuum tank.

3. The process according to claim 2, wherein the plate element lies along the at least one wall of the air filter housing.

4. The process according to claim 1, wherein the plate element lies along the at least one wall of the air filter housing.

5. A process of modulating noise during operation of an internal combustion engine comprising:

providing an air filter including an air filter housing having walls which encompass a filter chamber, a filter element which is positioned in the filter chamber, an intake, and an exhaust, and sealing off or opening up openings provided in at least one wall of the air filter housing via flexible flaps depending upon operating conditions of the internal combustion engine.

6. The process according to claim 5, wherein the flaps are controlled based upon pressure ratios that prevail within the air filter housing.

7. An air filter for an internal combustion engine comprising:

an air filter housing, walls of which encompass a filter chamber, a filter element positioned in the filter chamber, an intake, an exhaust, and a plate element that is equipped with openings and can be guided within the air filter housing provided in the air filter housings, wherein openings are provided in at least one of the walls of the air filter housing, wherein the openings can be sealed off or opened up depending upon operating conditions of the internal combustion engine, and wherein the plate element is oriented such that it can be shifted relative to the at least one of the walls in which the openings are provided.

8. The air filter in accordance with claim 7, wherein the plate element is controlled via an actuator which is connected to a vacuum tank.

9. The air filter in accordance with claim 8, wherein the plate element lies along the at least one of the walls of the air filter housing.

10. The air filter in accordance with claim 7, wherein the plate element lies along the at least one of the walls of the air filter housing.

11. An air filter for an internal combustion engine comprising:

an air filter housing, walls of which encompass a filter chamber, a filter element positioned in the filter chamber, an intake, and an exhaust, wherein openings are provided in at least one of the walls of the air filter housing, wherein the openings can be sealed off or opened up depending upon operating conditions of the internal combustion engine, and wherein the openings are monitored via flexible flaps.

12. The air filter in accordance with claim 11, wherein the flaps are controlled based upon pressure ratios that prevail within the air filter housing.

* * * * *